US012793594B2

(12) United States Patent
Yoo et al.

(10) Patent No.: US 12,793,594 B2
(45) Date of Patent: Nov. 10, 2026

(54) DISPLAY DEVICE, ELECTRONIC DEVICE INCLUDING THE DISPLAY DEVICE, AND METHOD OF COMPENSATING LUMINANCE OF DISPLAY PANEL USING THE DISPLAY DEVICE

(71) Applicant: Samsung Display Co., Ltd., Yongin-si (KR)

(72) Inventors: Gi-Na Yoo, Yongin-si (KR); Hyomin Kim, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/238,137

(22) Filed: Jun. 13, 2025

(65) Prior Publication Data

US 2026/0073825 A1 Mar. 12, 2026

(30) Foreign Application Priority Data

Sep. 6, 2024 (KR) ........................ 10-2024-0121591

(51) Int. Cl.

| | |
|---|---|
| ***G09G 3/00*** | (2006.01) |
| ***G09G 3/20*** | (2006.01) |
| ***G09G 3/32*** | (2016.01) |

(52) U.S. Cl.

CPC ........... *G09G 3/035* (2020.08); *G09G 3/2007* (2013.01); *G09G 3/32* (2013.01); *G09G 2300/0819* (2013.01); *G09G 2300/0842* (2013.01); *G09G 2320/0233* (2013.01); *G09G 2320/0673* (2013.01); *G09G 2320/0686* (2013.01); *G09G 2320/0693* (2013.01); *G09G 2354/00* (2013.01)

(58) Field of Classification Search

CPC ........ G09G 3/035; G09G 3/2007; G09G 3/32; G09G 2300/0819; G09G 2300/0842; G09G 2320/0233; G09G 2320/0673; G09G 2320/0686; G09G 2320/0693; G09G 2354/00

See application file for complete search history.

(56) References Cited

U.S. PATENT DOCUMENTS

2016/0127674 A1* 5/2016 Kim ................. H04N 21/42204 348/739
2016/0148554 A1* 5/2016 Lim ......................... G09G 3/20 345/694
2020/0066219 A1* 2/2020 Hsu ...................... G09G 3/3607

FOREIGN PATENT DOCUMENTS

| | | | |
|---|---|---|---|
| KR | 10-2223792 B1 | 3/2021 |
| KR | 10-2021-0105613 A | 8/2021 |
| KR | 10-2022-0070741 A | 5/2022 |
| KR | 10-2022-0094410 A | 7/2022 |

* cited by examiner

*Primary Examiner* — Amit Chatly

(74) *Attorney, Agent, or Firm* — Womble Bond Dickinson (US) LLP

(57) ABSTRACT

A display device includes: a display panel including compensation blocks; a driving controller configured to perform a luminance compensation on the compensation blocks to generate a data signal based on input image data; and a data driver configured to generate a data voltage based on the data signal and to provide the data voltage to the display panel, wherein the driving controller is configured to select a size and a position of the compensation blocks based on a selection curvature to perform the luminance compensation on the compensation blocks.

18 Claims, 14 Drawing Sheets

DISPLAY DEVICE, ELECTRONIC DEVICE INCLUDING THE DISPLAY DEVICE, AND METHOD OF COMPENSATING LUMINANCE OF DISPLAY PANEL USING THE DISPLAY DEVICE

CROSS-REFERENCE TO RELATED APPLICATION

The present application claims priority to and the benefit of Korean Patent Application No. 10-2024-0121591, filed on Sep. 6, 2024, in the Korean Intellectual Property Office, the entire disclosure of which is incorporated herein by reference.

BACKGROUND

1. Field

Aspects of some embodiments of the present disclosure relate to a display device and an electronic device including the same.

2. Description of the Related Art

In general, a display device includes a display panel and a display panel driver. The display panel includes gate lines, data lines, and pixels. The display panel driver includes a gate driver for providing a gate signal to the gate lines, a data driver for providing a data voltage to the data lines, and a driving controller for controlling the gate driver and the data driver. The display panel driver may further include a power management integrated circuit for generating a power voltage and outputting the power voltage to the display panel.

In order to reduce a power consumption of the display device, the display panel may be divided into blocks. The driving controller may determine levels of power voltages applied to each of the blocks, and the power management integrated circuit may output the power voltages to the blocks through power voltage lines. Meanwhile, unlike the prior art, because the power management integrated circuit outputs various power voltages, a problem in which a size of the power management integrated circuit increases has occurred.

The above information disclosed in this Background section is only for enhancement of understanding of the background and therefore the information discussed in this Background section does not necessarily constitute prior art.

SUMMARY

Aspects of some embodiments of the present disclosure relate to a display device and an electronic device including the same. For example, aspects of some embodiments of the present disclosure relate to a display device and an electronic device including the same for precisely setting a power voltage to reduce a power consumption and to relatively improve a display quality.

Aspects of some embodiments of the present disclosure include a display device for performing a luminance compensation in an edge area of a display panel to provide a relatively improved display quality.

Aspects of some embodiments of the present disclosure include an electronic device including the display device.

Aspects of some embodiments of the present disclosure include a method of compensating a luminance of a display panel using the display device.

According to some embodiments of the present disclosure, a display device includes: a display panel including compensation blocks, a driving controller configured to perform a luminance compensation on the compensation blocks to generate a data signal based on input image data, and a data driver configured to generate a data voltage based on the data signal and provides the data voltage to the display panel. According to some embodiments, the driving controller is configured to select a size and a position of the compensation blocks based on a selection curvature to perform the luminance compensation on the compensation blocks.

According to some embodiments, the selection curvature may be variable according to a user setting through a user interface.

According to some embodiments, as a distance from a center line increases, a perceived luminance of a test image displayed on the user interface may decrease.

According to some embodiments, a luminance compensation value of the test image may be different according to the selection curvature.

According to some embodiments, the luminance compensation value of the test image may increase when the selection curvature increases.

According to some embodiments, the driving controller may be configured to calculate a target angle based on the selection curvature.

According to some embodiments, the compensation blocks may include first compensation blocks having a first size and second compensation blocks having a second size different from the first size. According to some embodiments, the driving controller may be configured to calculate a size and a position of the first compensation blocks and the second compensation blocks based on the target angle.

According to some embodiments, the second size may be greater than the first size.

According to some embodiments, the second size may increase when the target angle increases.

According to some embodiments, a position of the first compensation blocks may be closer to a center line than a position of the second compensation blocks.

According to some embodiments, a ratio of the second compensation blocks to an entire display area of the display panel may increase when the target angle increases.

According to some embodiments, the compensation blocks may include third compensation blocks having a third size different from the first size and the second size. According to some embodiments, the driving controller may be configured to calculate a size and a position of the first compensation blocks, the second compensation blocks, and the third compensation blocks based on the target angle.

According to some embodiments, the third size may be greater than the first size and the second size, and the second size may be greater than the first size.

According to some embodiments, a distance from a center line may increase in an order of the first compensation blocks, the second compensation blocks, and the third compensation blocks.

According to some embodiments, the display device may further comprise a user gaze tracking unit that tracks the user's gaze. According to some embodiments, the driving controller may be configured to select the size and the position of the compensation blocks based on a gaze of the user and the selection curvature, and to perform the luminance compensation on the compensation blocks.

According to some embodiments of the present disclosure, an electronic device includes: a display panel including compensation blocks, a driving controller configured to perform a luminance compensation on the compensation blocks to generate a data signal based on input image data, a data driver configured to generate a data voltage based on the data signal and provides the data voltage to the display panel, and a processor configured to control the driving controller. According to some embodiments, the driving controller is configured to select a size and a position of the compensation blocks based on a selection curvature to perform the luminance compensation on the compensation blocks.

According to some embodiments of the present disclosure, in a method of compensating a luminance of a display panel, the method includes: selecting a selection curvature, selecting a size and a position of compensation blocks based on the selection curvature, and performing a luminance compensation on the compensation blocks.

According to some embodiments, the selection curvature may be variable according to a user setting through a user interface.

According to some embodiments, as a distance from a center line increases, a perceived luminance of a test image displayed on the user interface may decrease.

According to some embodiments, a luminance compensation value of the test image may be different according to the selection curvature.

According to the display device, the electronic device, and the method, the size and the position of the compensation blocks may be selected based on the selection curvature, and the luminance compensation may be performed on the compensation blocks. Accordingly, the display quality may be relatively improved.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION

Hereinafter, the present inventive concept will be described in more detail with reference to the accompanying drawings.

Figure 1:
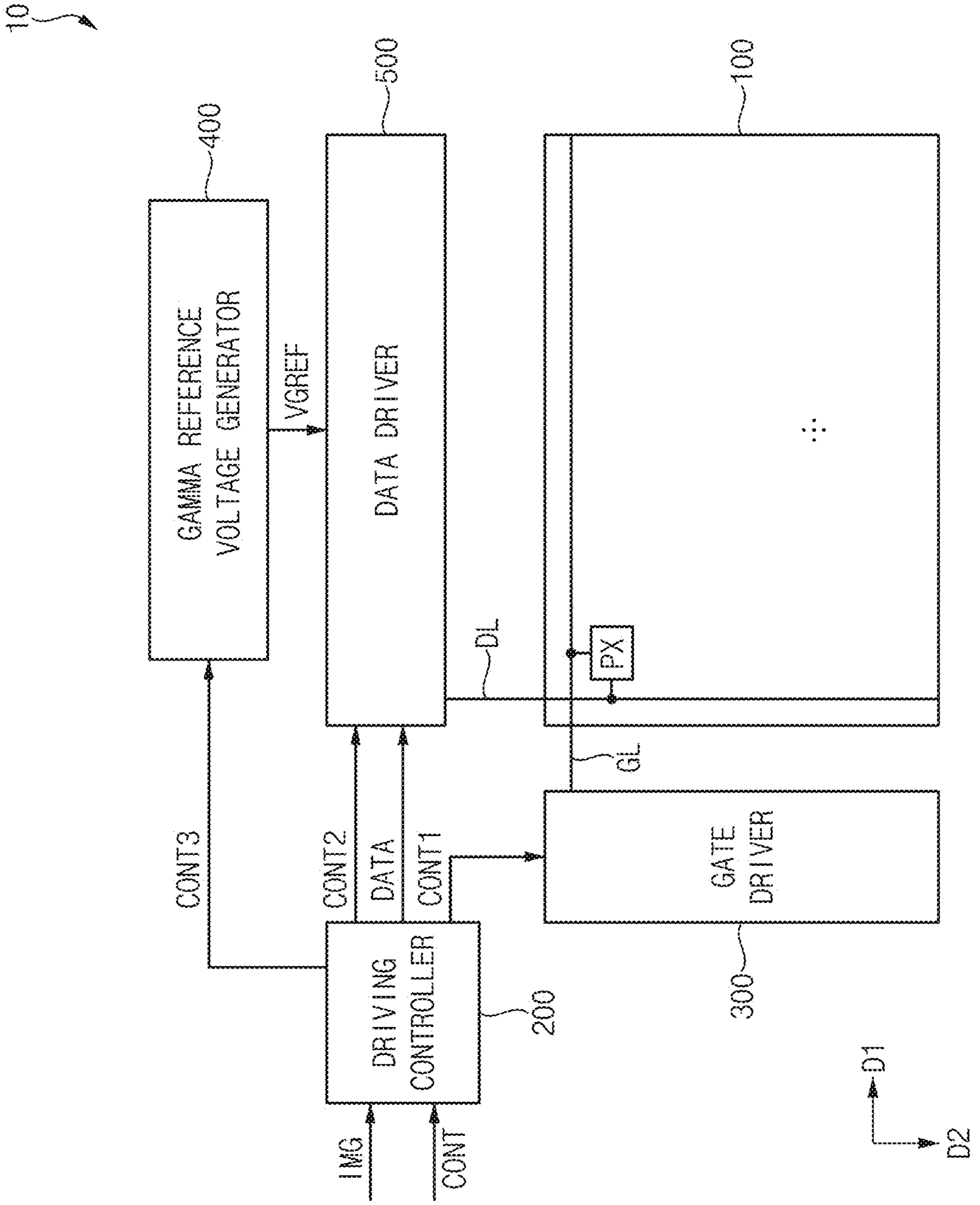
FIG. 1 is a block diagram showing a display device according to embodiments of the present inventive concept.

FIG. 1 is a block diagram showing a display device 10 according to embodiments of the present inventive concept.

Referring to FIG. 1, a display device 100 may include a display panel 100 and a display panel driver. The display panel driver may include a driving controller 200, a gate driver 300, a gamma reference voltage generator 400, and a data driver 500.

The display panel 100 may include a display area for displaying an image and a peripheral area located adjacent to the display area.

The display panel 100 may include gate lines GL, data lines DL, and pixels PX electrically connected to the gate lines GL and the data lines DL, respectively. The gate lines GL may extend in a first direction D1, the data lines DL may extend in a second direction D2 crossing the first direction D1. Although FIG. 1 illustrates a single pixel PX, a single gate line GL, and a single data line DL, as a person having ordinary skill in the art would recognize, the display panel 100 may include any suitable number of pixels, gate lines, and data lines according to the design and size of the display panel 100.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be located in the driving controller 200 or may be located in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

Figure 2:
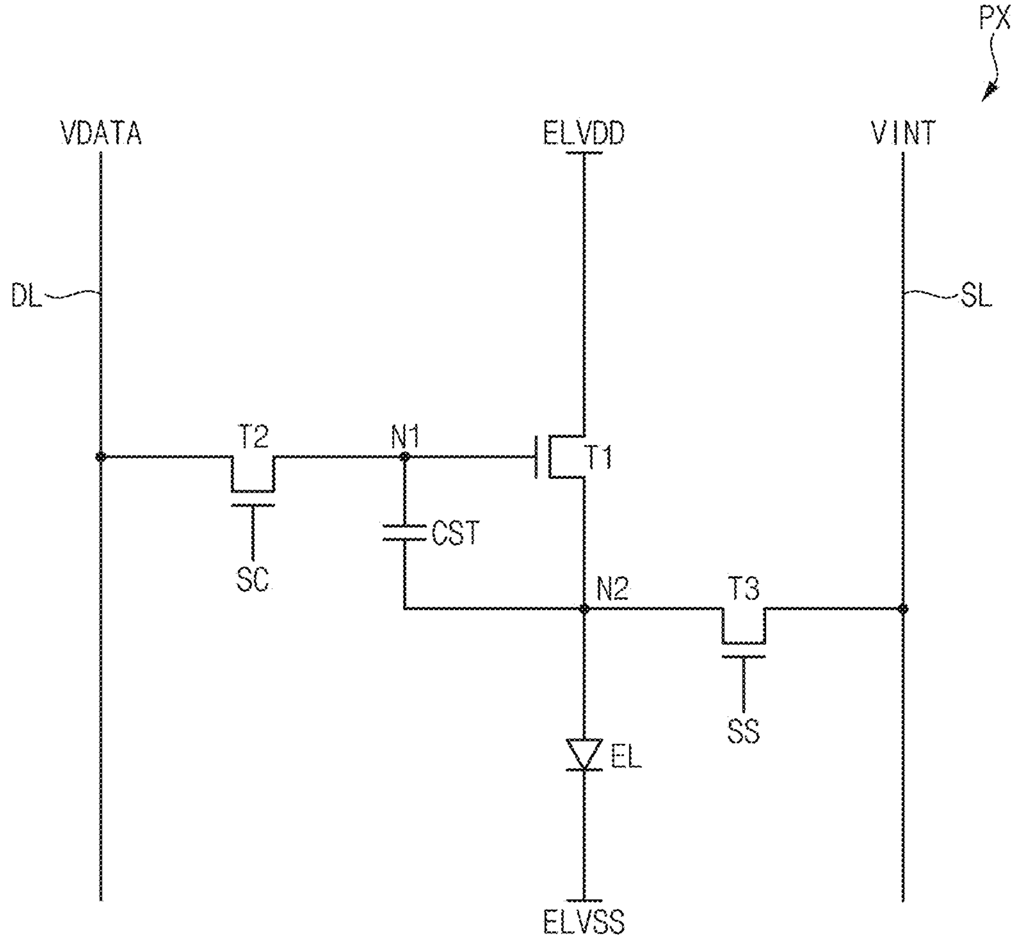
FIG. 2 is a circuit diagram showing an example of a pixel of FIG. 1.

FIG. 2 is a circuit diagram showing an example of a pixel PX of FIG. 1. Although FIG. 2 illustrates various components in a pixel according to some embodiments, embodiments according to the present disclosure are not limited thereto, and according to various embodiments, the pixel may include additional components or fewer components without departing from the spirit and scope of embodiments according to the present disclosure.

Referring to FIG. 1 and FIG. 2, a pixel PX may include a first transistor T1, a second transistor T2, a third transistor T3, and a storage capacitor CST. In an embodiment, the first transistor T1, the second transistor T2, and the third transistor T3 may be N-type transistors.

The first transistor T1 may include a gate electrode connected to a first node N1, a first electrode connected to a first power voltage line transmitting a first power voltage ELVDD, and a second electrode connected to a second node N2. The first transistor T1 may generate a driving current based on a voltage of the first node N1 and a voltage of the second node N2.

The second transistor T2 may include a gate electrode receiving a scan signal SC as a gate signal, a first electrode connected to a data line DL transmitting a data voltage VDATA, and a second electrode connected to the first node N1. The second transistor T2 may be turned on in response to the scan signal SC to provide the data voltage VDATA to the first node N1. The data voltage VDATA may vary according to a grayscale. For example, the grayscale may be 0-grayscale to 255-grayscale, and as the grayscale increases, the data voltage VDATA may increase.

The third transistor T3 may include a gate electrode receiving a sensing signal SS as a gate signal, a first electrode connected to a sensing line SL transmitting an initialization voltage VINT, and a second electrode connected to the second node N2. The third transistor T3 may be turned on in response to the sensing signal SS to provide the initialization voltage VINT to the second node N2. In this case, the second node N2 may be initialized with the initialization voltage VINT.

The storage capacitor CST may include a first electrode connected to the first node N1 and a second electrode connected to the second node N2. The storage capacitor CST may store a voltage corresponding to the data voltage VDATA at a positive electrode. Therefore, the first transistor T1 may generate the driving current based on the voltage corresponding to the data voltage VDATA.

The light emitting element EL may include an anode connected to the second node N2 and a cathode connected to a second power voltage line that transmits a second power voltage ELVSS. The light emitting element EL may emit a light based on the driving current. A luminance expressed by the light emitting element EL may be determined based on an intensity of the driving current. The intensity of the driving current may be determined based on the data voltage VDATA.

Figure 3:
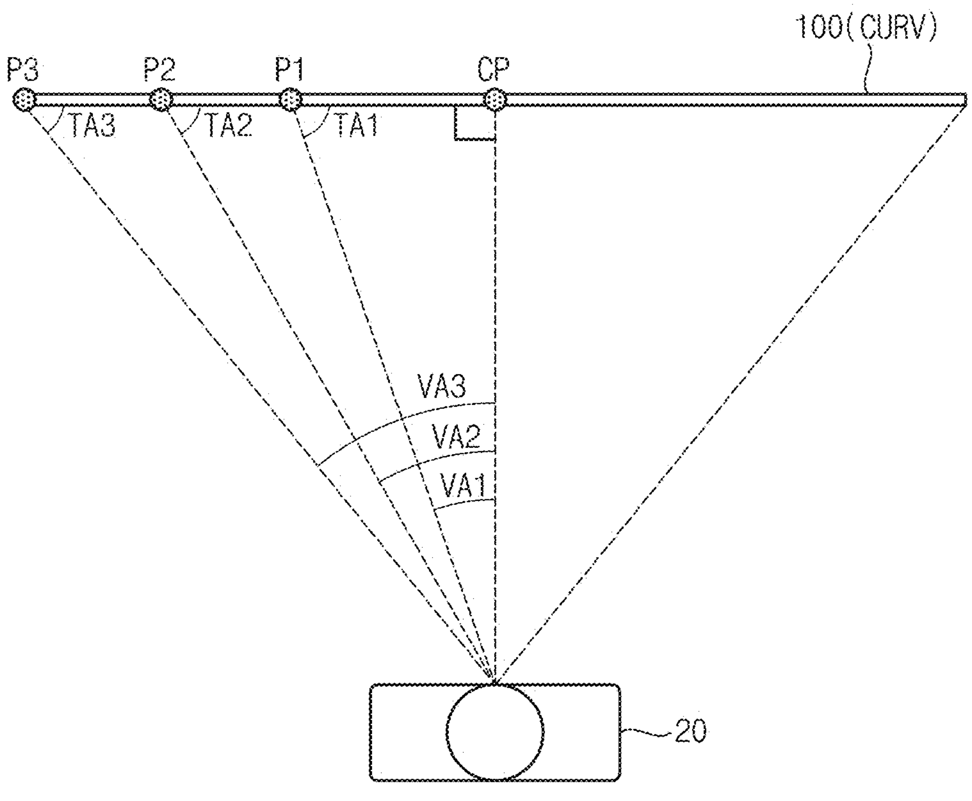
FIG. 3 is a diagram explaining a target angle according to a viewing angle of a user 20.
Figure 4:
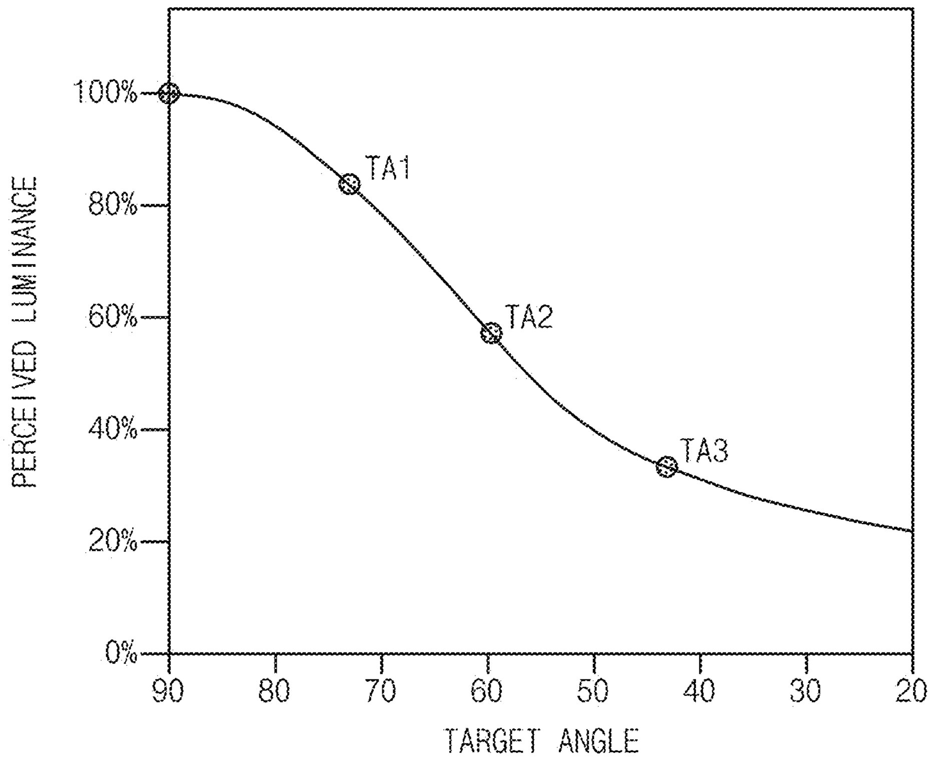
FIG. 4 is a diagram showing a perceived luminance according to a target angle.
Figure 5:
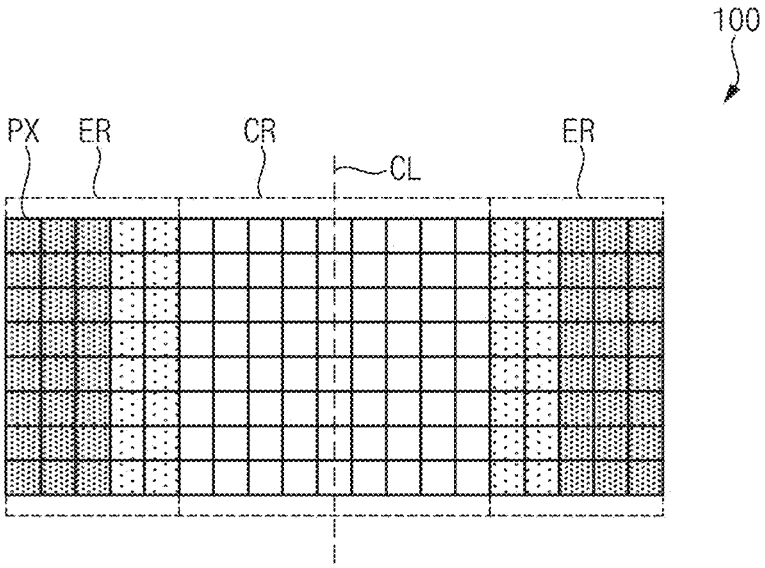
FIG. 5 is a diagram showing a perceived luminance according to the position of pixels.

FIG. 3 is a diagram explaining a target angle according to a viewing angle of a user 20. FIG. 4 is a diagram showing a perceived luminance according to a target angle. FIG. 5 is a diagram showing a perceived luminance according to the position of pixels PX.

Referring to FIGS. 1 to 5, it may be assumed that a user 20 is viewing a display panel 100. In this case, the display panel 100 may be a flat display panel with a curvature CURV of 0 and may have a same display luminance throughout an entire display area. However, a viewing angle and a target angle may be different according to a position of the pixels PX included in the display panel 100, and thus, a perceived luminance may be different. Here, the curvature CURV refers to a degree to which the display panel 100 is bent, the display luminance refers to a luminance expressed by the pixels PX, and the perceived luminance refers to a luminance which the display luminance is perceived by the user 20.

For example, as shown in FIG. 3, the display panel 100 may include a center point CP, a first position P1, a second position P2, and a third position P3. At the center point CP, the viewing angle may be 0 degrees, and the target angle may be 90 degrees. At the first position P1, the viewing angle may be a first viewing angle VA1, and the target angle may be a first target angle TA1. At the second position P2, the viewing angle may be a second viewing angle VA2, and the target angle may be a second target angle TA2. At the third position P3, the viewing angle may be a third viewing angle VA3, and the target angle may be a third target angle TA3. The first viewing angle VA1 may be greater than 0 degrees, and the first target angle TA1 may be less than 90 degrees. The second viewing angle VA2 may be greater than the first viewing angle VA1, and the second target angle TA2 may be less than the first target angle TA1. The third viewing angle VA3 may be greater than the second viewing angle VA2, and the third target angle TA3 may be less than the second target angle TA2.

As shown in FIGS. 3 and 4, the center point CP, the first position P1, the second position P2, and the third position P3 may be spaced apart from the center line CL in that order. As a distance from the center line CL increases, the perceived luminance may decrease. For example, when the target angle is 90 degrees, the perceived luminance may be 100%. For example, when the target angle is the first target angle TA1, the perceived luminance may be 80% (or approximately 80%). For example, when the target angle is the second target angle TA2, the perceived luminance may be 50% (or approximately 50%). For example, when the target angle is the third target angle TA3, the perceived luminance may be 30% (or approximately 30%).

In summary, as shown in FIG. 5, the display panel 100 may include a center region CR and an edge region ER. As the distance from the center line CL increases, the perceived luminance may decrease. Therefore, a perceived luminance of the center region CR may be relatively large, and a perceived luminance of the edge region ER may be relatively small.

As such, when the display panel 100 is a flat display panel with a curvature CURV of 0, the perceived luminance may differ according to the position of the pixels PX included in the display panel 100, and a display quality may be low.

Figure 6:
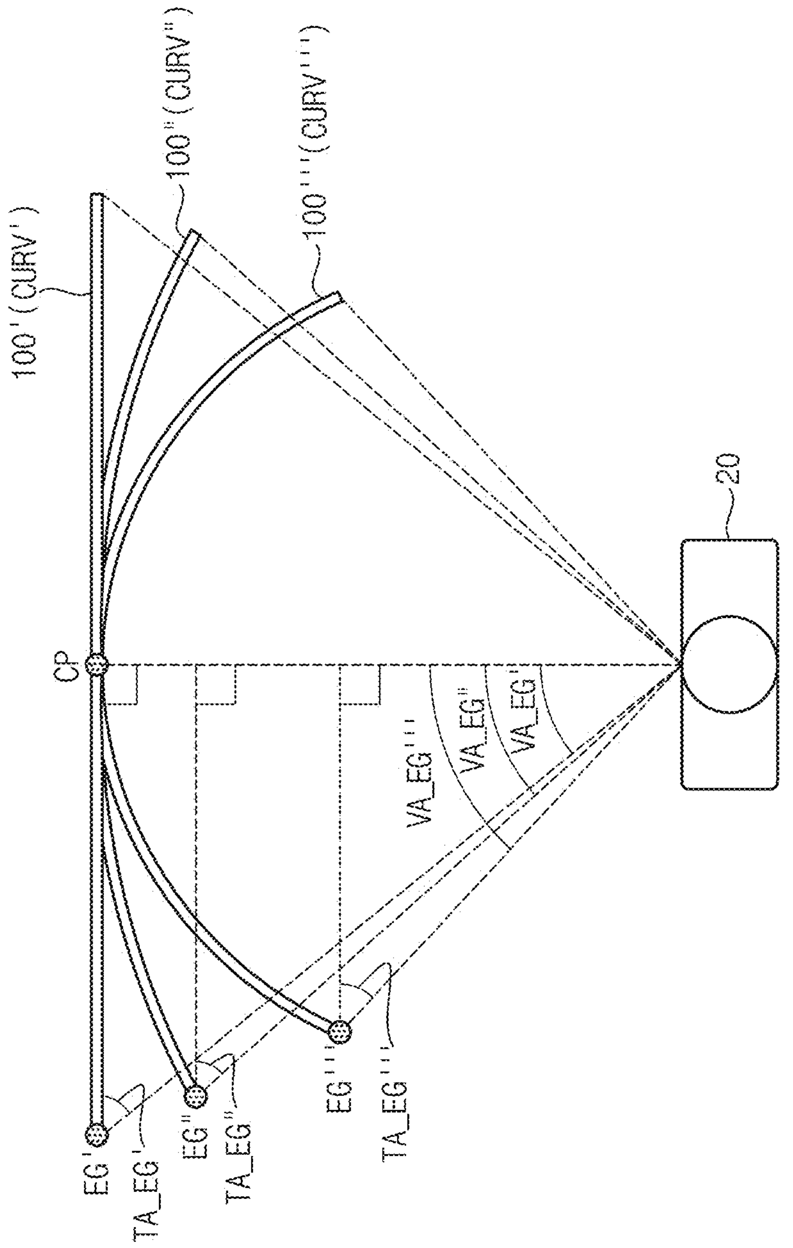
FIG. 6 is a diagram explaining a target angle according to a curvature of a display panel.
Figure 7:
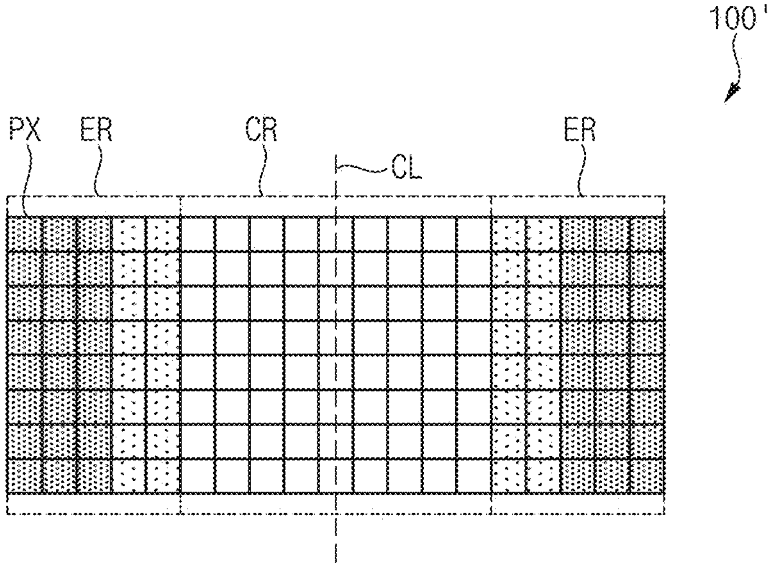
FIGS. 7 to 9 are diagrams showing a luminance of pixels included in a display panel according to a curvature of the display panel.
Figure 8:
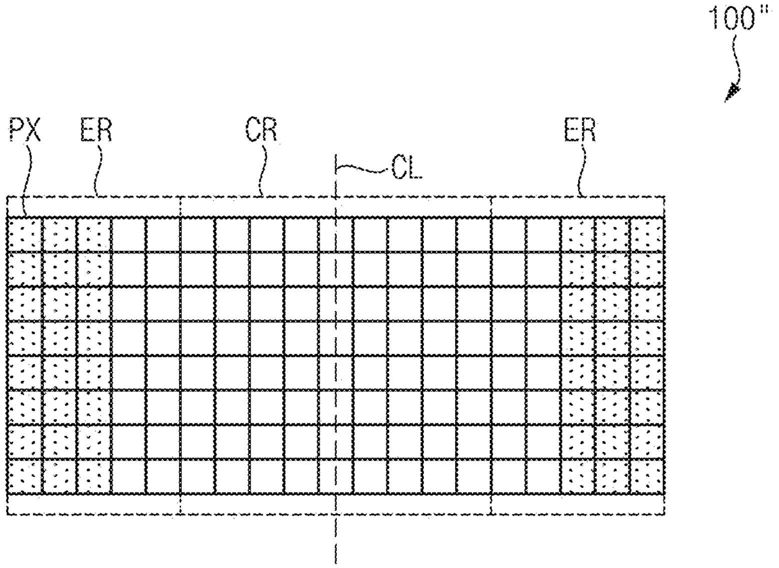
Figure 9:
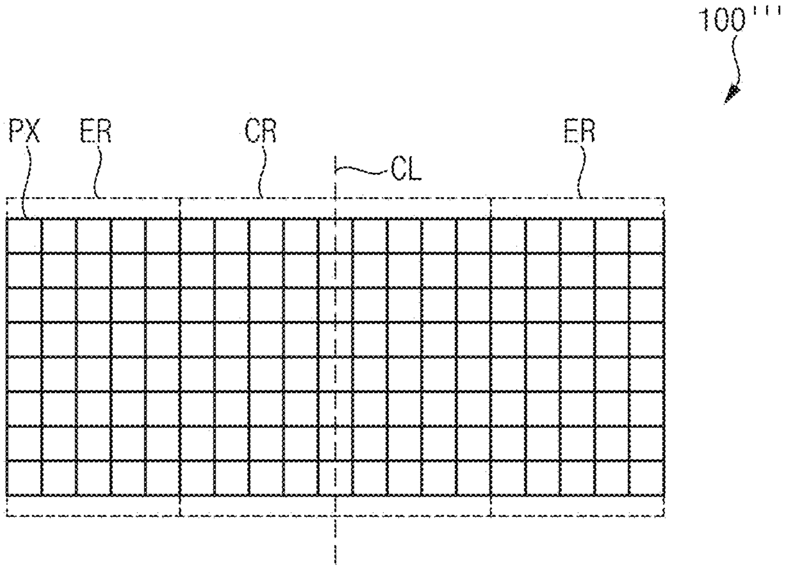

FIG. 6 is a diagram explaining a target angle according to a curvature CURV of a display panel 100. FIGS. 7 to 9 are diagrams showing a luminance of pixels PX included in a display panel 100 according to a curvature CURV of the display panel 100.

Referring to FIGS. 1 to 9, one of methods for increasing a perceived luminance of an edge region ER is to use a curved display panel as the display panel 100. The curved display panel refers to a display panel 100 in which a curvature CURV of the display panel 100 is greater than 0.

In order to explain a principle of compensating for the perceived luminance of the edge region ER using the curved display panel, a first display panel 100', a second display panel 100", and a third display panel 100"' are illustrated. The first display panel 100', the second display panel 100", and the third display panel 100"' may have different curvatures CURV', CURV", CURV"'.

The first display panel 100' may be a flat display panel, and the second display panel 100" and the third display panel 100"' may be the curved display panels. Here, a length of the first display panel 100', a length of the second display panel 100", and a length of the third display panel 100"' may be equal to each other.

The first display panel 100' may have a first curvature CURV', the second display panel 100" may have a second curvature CURV", and the third display panel 100"' may have a third curvature CURV"'. The first curvature CURV' may be 0, the second curvature CURV" may be greater than the first curvature CURV', and the third curvature CURV"' may be greater than the second curvature CURV".

The first to third display panels 100', 100", 100"' may have different target angles for edges. The first display panel 100' may have a viewing angle VA_EG' and a target angle TA_EG' for the first edge EG'. The second display panel 100" may have a viewing angle VA_EG" and a target angle TA_EG" for the second edge EG". The third display panel 100"' may have a viewing angle VA_EG"' and a target angle TA_EG"' for the third edge EG"'. The viewing angle VA_EG" for the second edge EG" may be greater than the viewing angle VA_EG' for the first edge EG', and the target angle TA_EG" for the second edge EG" may be less than the target angle TA_EG' for the first edge EG'. The viewing angle VA_EG"' for the third edge EG"' may be greater than the viewing angle VA_EG" for the second edge EG", and the target angle TA_EG"' for the third edge EG"' may be less than the target angle TA_EG" for the second edge EG".

A distance between the second edge EG" and the user 20 may be shorter than a distance between the first edge EG' and the user 20. The distance between the third edge EG"' and the user 20 may be shorter than the distance between the second edge EG" and the user 20. Therefore, a perceived luminance of an edge region ER of the second display panel 100" may be greater than a perceived luminance of an edge region ER of the first display panel 100'. A perceived luminance of an edge region ER of the third display panel 100"' may be greater than the perceived luminance of the edge region ER of the second display panel 100".

As such, when the user 20 uses the curved display device, the display quality may be relatively improved. In this case, a curvature CURV most suitable for the user 20 may vary according to a distance between the user 20 and the display panel 100 (i.e., a viewing distance) and a cognitive ability of the user 20.

However, the user 20 may use the flat display panel instead of the curved display panel. A display device 10 according to embodiments of the present inventive concept includes the flat display panel, but may perform a luminance compensation on the edge region ER by utilizing the principle that the curved display panel compensates for the perceived luminance of the edge region ER.

Figure 10:
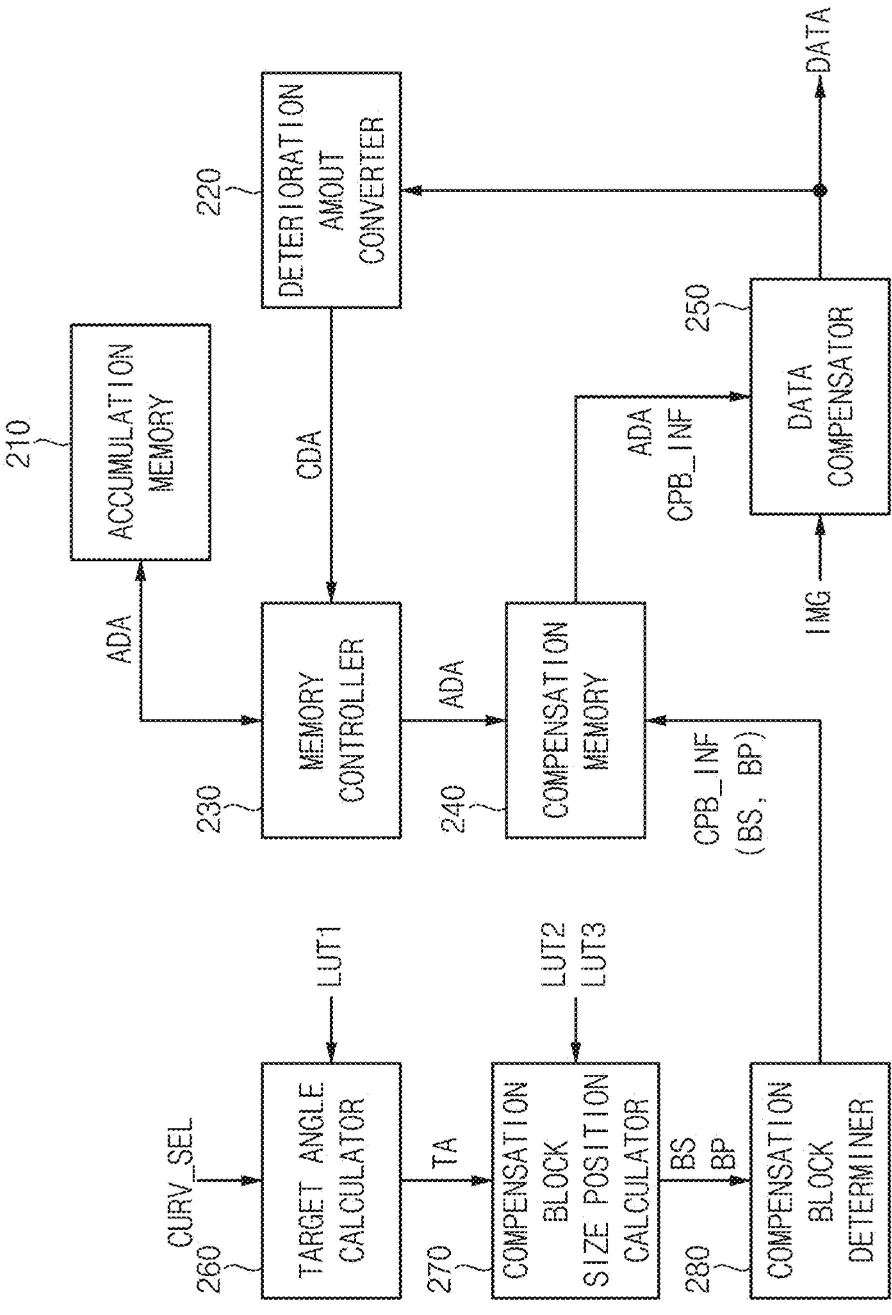
FIG. 10 is a block diagram showing a driving controller of FIG. 1.
Figure 11:
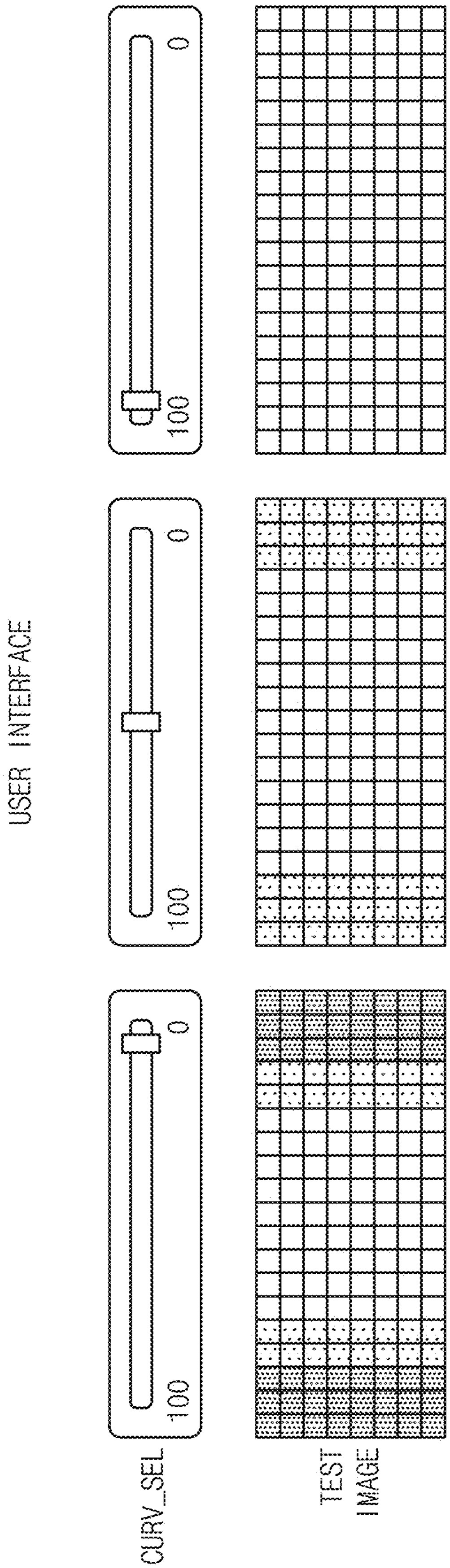
FIG. 11 and FIG. 12 are diagrams explaining an operation of selecting a selection curvature of FIG. 10 through a user interface.
Figure 12:
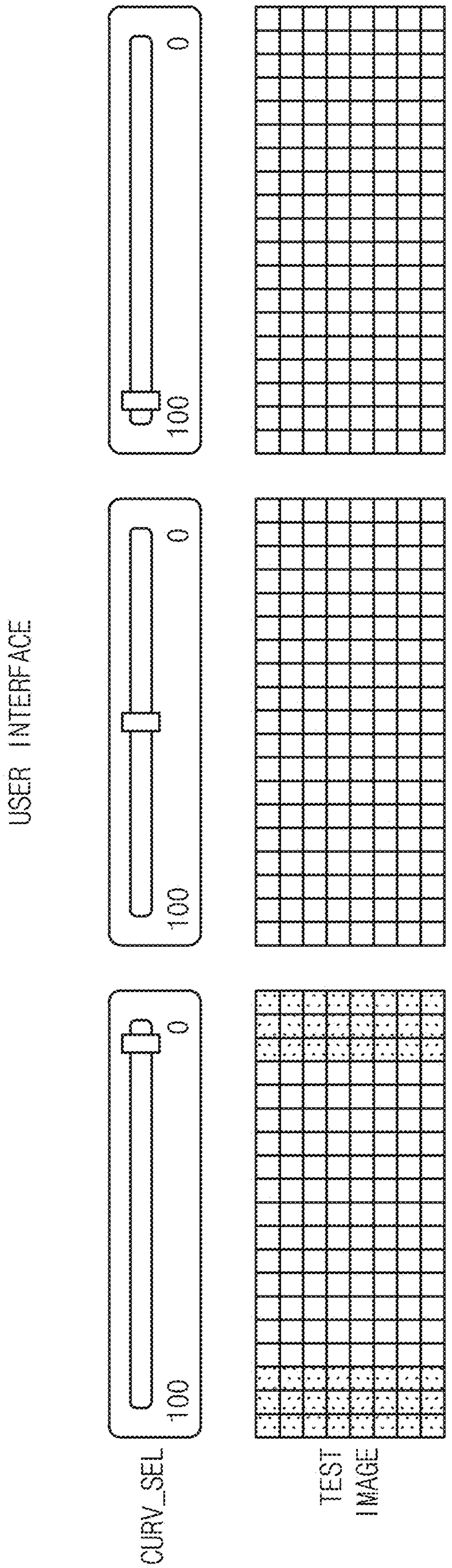

FIG. 10 is a block diagram showing a driving controller 200 of FIG. 1. FIG. 11 and FIG. 12 are diagrams explaining an operation of selecting a selection curvature CURV_SEL of FIG. 10 through a user interface. FIG. 13 to FIG. 16 are diagrams showing a compensation block size BS and a compensation block position BP of FIG. 10.

Referring to FIG. 1 to FIG. 16, a driving controller 200 may perform a luminance compensation on pixels PX. For example, the driving controller 200 may select a size BS and a position BP of the compensation blocks CPB based on a selection curvature CURV_SEL and perform the luminance compensation on the pixels PX included in the compensation blocks CPB.

The driving controller 200 may include an accumulation memory 210, a deterioration amount converter 220, a memory controller 230, a compensation memory 240, a data compensator 250, a target angle calculator 260, a compensation block size position calculator 270, and a compensation block determiner 280.

The accumulation memory 210 may store an accumulated deterioration amount ADA. Because the accumulated deterioration amount ADA indicates a degree of a deterioration of the pixels PX, the accumulation memory 210 may be a nonvolatile memory such that the accumulated deterioration amount ADA is not erased even when the display device 10 is turned off. According to some embodiments, the accumulation memory 210 may be implemented as a flash memory, but is not limited thereto.

The deterioration amount converter 220 may receive a data signal DATA and convert the data signal DATA into a current deterioration amount CDA of a current frame. The deterioration amount converter 220 may provide the current deterioration amount CDA of the current frame to the memory controller 230.

The memory controller 230 may receive an accumulated deterioration amount of a previous frame from the accumulation memory 210, and may receive the current deterioration amount CDA of the current frame from the deterioration amount converter 220. The memory controller 230 may accumulate the current deterioration amount CDA of the current frame to an accumulated deterioration amount of the previous frame to generate the accumulated deterioration amount ADA of the current frame. That is, the memory controller 230 may update the accumulated deterioration amount ADA for each frame. The memory controller 230 may provide the accumulated deterioration amount ADA of the current frame to the accumulation memory 210. In addition, the memory controller 230 may provide the accumulated deterioration amount ADA of the current frame to the compensation memory 240.

The compensation memory 240 may receive the accumulated deterioration amount ADA from the memory controller 230 and may receive an information CPB_INF about the compensation blocks CPB from the compensation block determiner 280. The information CPB_INF about the compensation blocks CPB may include a compensation block size BS and a compensation block position BP. The compensation memory 240 may provide the accumulated deterioration amount ADA and the information CPB_INF about the compensation blocks CPB to the data compensator 250.

The data compensator 250 may receive the accumulated deterioration amount ADA and the information CPB_INF about the compensation blocks CPB from the compensation memory 240. The data compensator 250 may generate a luminance compensation value of the pixels PX based on the accumulated deterioration amount ADA and the information CPB_INF about the compensation blocks CPB. The data compensator 250 may apply the luminance compensation value of the pixels PX to input image data IMG to generate the data signal DATA.

As shown in FIGS. 11 and 12, the selection curvature CURV may vary according to a setting of a user 20 through a user interface UI. For example, the user 20 may access a setting environment of the display device 10. The user interface may be displayed in the setting environment of the display device 10. The user interface may include the selection curvature CURV_SEL and a test image. As a distance from the center line CL increases, a perceived luminance may decrease.

In an initial setting stage, the selection curvature CURV_SEL may be 0. When the selection curvature CURV_SEL is 0, the display panel 100 may express a display luminance corresponding to a curvature CURV of 0. The perceived luminance may vary according to a position of the pixels PX included in the display panel 100. The perceived luminance may further vary according to a cognitive ability of the user 20.

The user 20 may increase the selection curvature CURV_SEL. When the selection curvature CURV_SEL increases, the perceived luminance of the edge area may increase, and the user 20 may select a test image suitable for his or her cognitive ability.

For example, a user of FIG. 11 may be different from a user of FIG. 12. A cognitive ability of the user of FIG. 11 may be different from a cognitive ability of the user of FIG. 12. The user of FIG. 11 may select 100 as the selection curvature CURV_SEL. The user of FIG. 12 may select 50 as the selection curvature CURV_SEL.

The luminance compensation value of the edge area of the test image may vary according to the selection curvature CURV. When the selection curvature CURV is 100, the luminance compensation value of the edge area of the test image may be greater than when the selection curvature CURV is 50. That is, the user of FIG. 11 may perceive the luminance change more sensitively than the user of FIG. 12.

The target angle calculator 260 may receive the selection curvature CURV from the user interface. The target angle calculator 260 may calculate a target angle TA based on the selection curvature CURV_SEL. The selection curvature CURV_SEL may correspond to the curvature CURV, and the target angle TA may be calculated based on the curvature CURV. According to some embodiments, a first lookup table LUT1 may store the target angle TA corresponding to the selection curvature CURV_SEL, and the target angle calculator 260 may calculate the target angle TA based on the selection curvature CURV_SEL using the first lookup table LUT1.

The compensation block size position calculator 270 may calculate a compensation block size BS and a compensation block position BP based on the target angle TA. According to some embodiments, the second lookup table LUT2 may store the compensation block size BS corresponding to the target angle TA, the third lookup table LUT3 may store the compensation block position BP corresponding to the target angle TA, and the compensation block size position calculator 270 may calculate the compensation block size BS and the compensation block position BP based on the target angle TA using the second lookup table LUT2 and the third lookup table LUT3.

As described above, when the selection curvature CURV is large, the user 20 may sensitively perceive the luminance change. Therefore, when the selection curvature CURV is large, the driving controller 200 may perform the luminance compensation on the pixels PX in detail.

The compensation blocks CPB may include first compensation blocks CPB1 and second compensation blocks CPB2. Each of the first compensation blocks CPB1 may have a first size BS1, and each of the second compensation blocks CPB2 may have a second size BS2 different from the first size BS1. A position BP1 of the first compensation blocks CPB1 may be closer to the center line CL than a position BP2 of the second compensation blocks CPB2.

The user 20 may be able to perceive the luminance change more sensitively as a distance from the center line CL becomes smaller. Therefore, as shown in FIGS. 13 to 16, the second size BS2 may be larger than the first size BS1. When the second size BS2 is greater than the first size BS1, a number of pixels PX included in the second compensation blocks CPB2 may be greater than a number of pixels PX included in the first compensation blocks CPB1. Therefore, because a number of pixels PX to which a same luminance compensation value is applied is greater in the second compensation blocks CPB2 than in the first compensation blocks CPB1, the luminance compensation on the pixels PX in the center region CR of the display panel 100 may be performed in detail.

Figure 13:
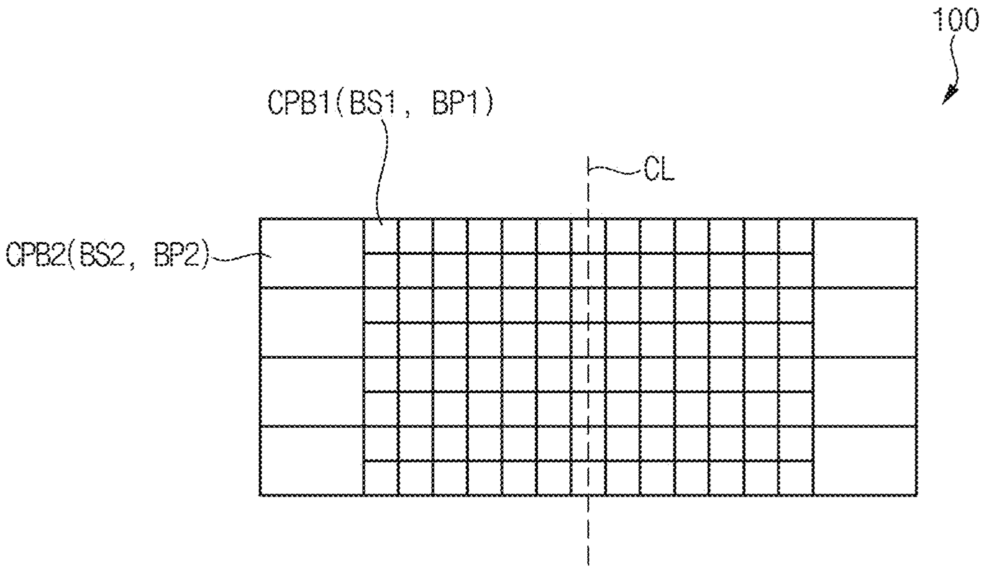
FIG. 13 to FIG. 16 are diagrams showing a compensation block size and a compensation block position of FIG. 10.
Figure 14:
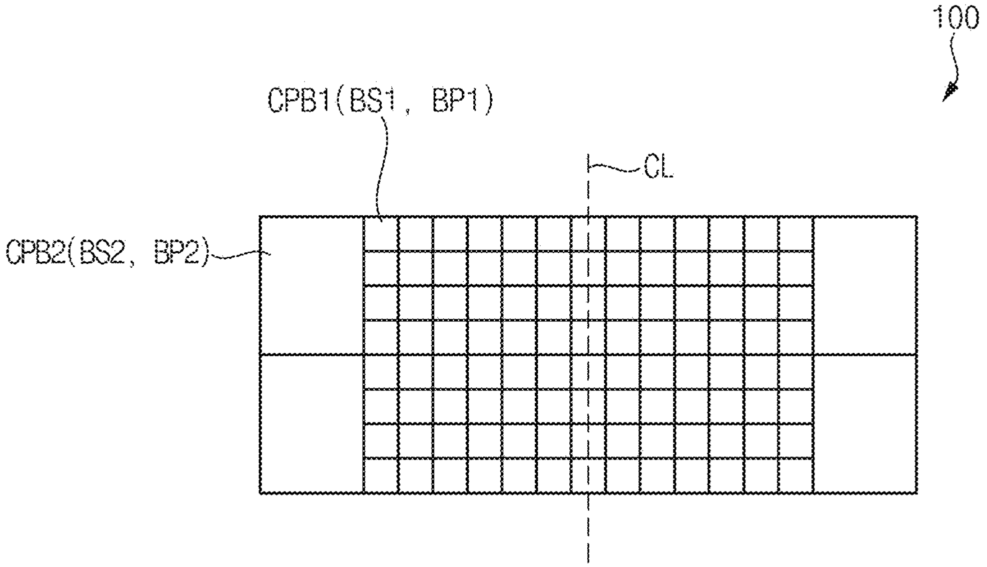
Figure 15:
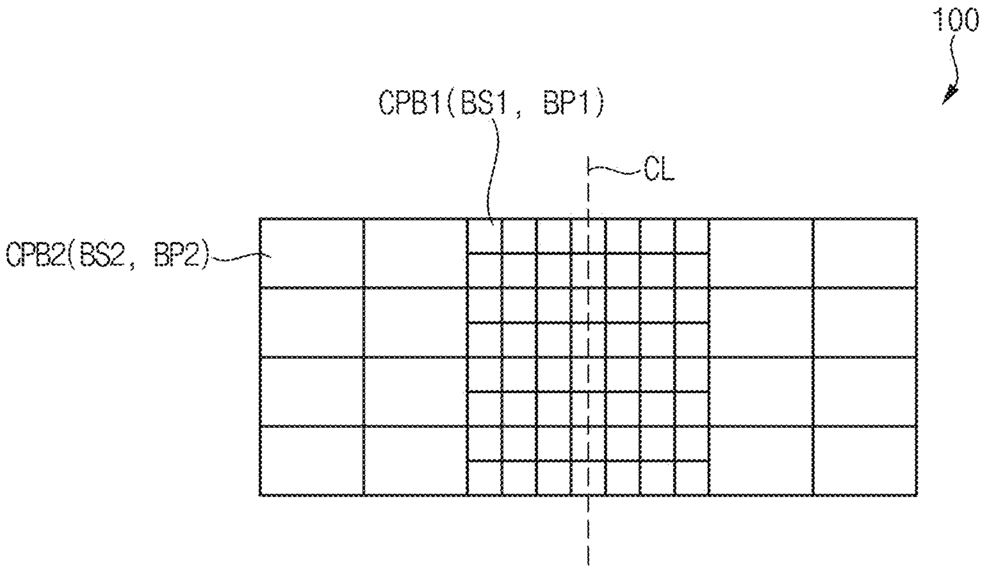
Figure 16:
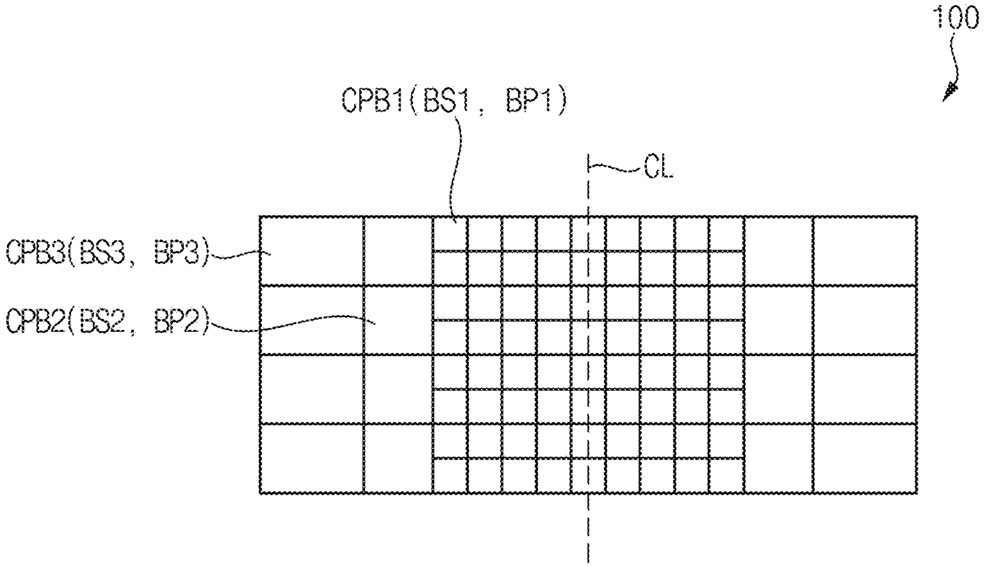

The second size BS2 may vary according to the target angle TA. When the selection curvature CURV_SEL increases, the target angle TA may decrease. Therefore, when the target angle TA decreases, the user 20 may sensitively perceive the luminance change. On the other hand, when the target angle TA increases, the user 20 may insensitively perceive the luminance change. Therefore, when the target angle TA increases, the second size BS2 may increase, as shown in FIGS. 13 and 14. In addition, when the target angle TA increases, a ratio of the second compensation blocks CPB2 to an entire display area of the display panel 100 may increase, as shown in FIGS. 13 and 15. In addition, the compensation blocks CPB may include third compensation blocks CPR3 as well as the first compensation blocks CPB1 and the second compensation blocks CPB2. The third compensation blocks CPR3 may have a third size BS3, and the third size BS3 may be greater than the first size BS1 and the second size BS2. A distance from the center line CL may increase in an order of the first compensation blocks CPB1, the second compensation blocks CPB2, and the third compensation blocks CPB3.

As such, the display device 10 may select a size and a position of the compensation blocks CPB based on the selection curvature CURV_SEL to perform the luminance compensation on the compensation blocks. Accordingly, a display quality may be relatively improved.

Meanwhile, the display device 10 may further include a user gaze tracker which tracks a gaze of the user 20. In this case, the driving controller 200 may select the size and the position of the compensation blocks CPB based on the gaze of the user 20 and the selection curvature CURV_SEL to perform the luminance compensation on the compensation blocks.

Figure 17:
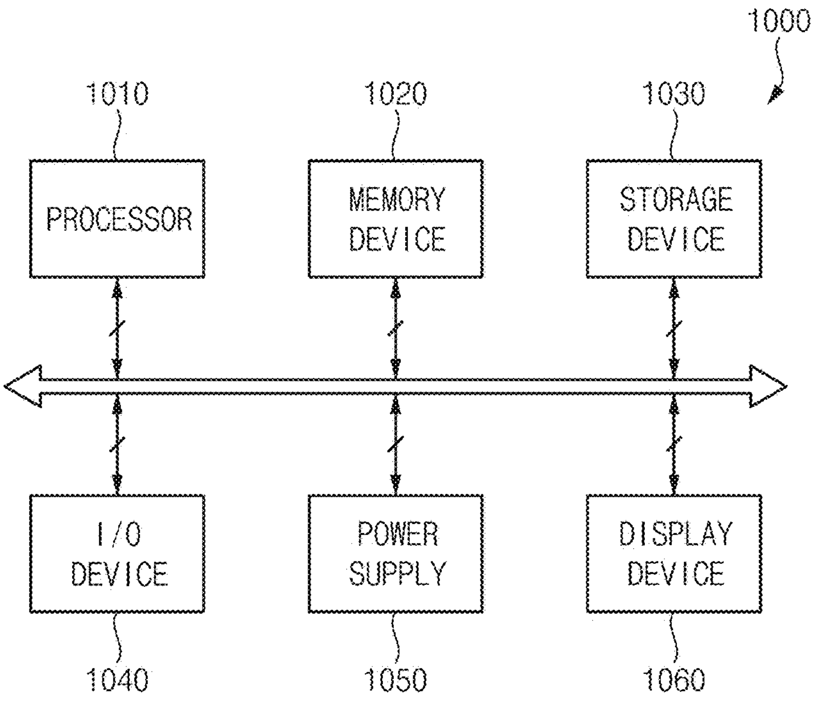
FIG. 17 is a block diagram showing an electronic device.
Figure 18:
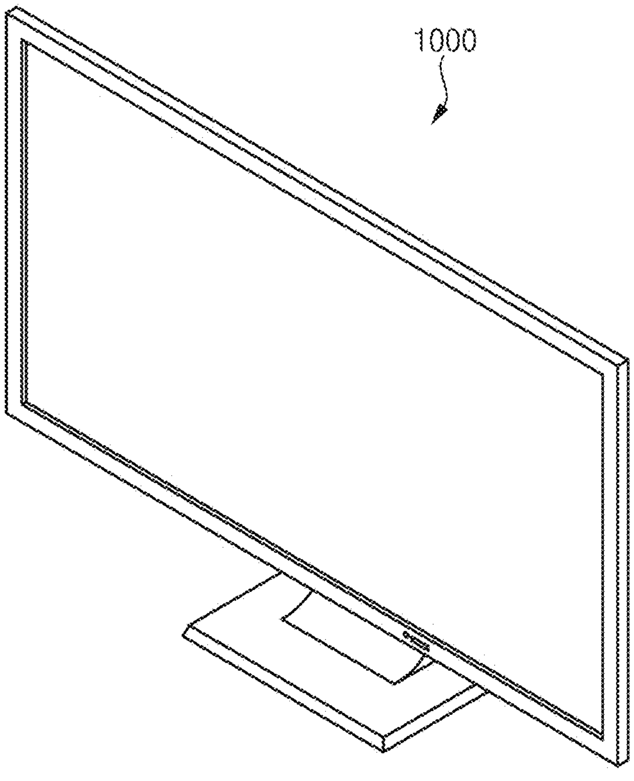
FIG. 18 is a diagram showing an embodiment in which an electronic device of FIG. 17 is implemented as a computer monitor.

FIG. 17 is a block diagram showing an electronic device 1000. FIG. 18 is a diagram showing an embodiment in which an electronic device 1000 of FIG. 17 is implemented as a computer monitor.

Referring to FIGS. 13 and 14, the electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

According to some embodiments, as shown in FIG. 14, the electronic device 1000 may be implemented as a computer monitor. However, the electronic device 1000 is not limited thereto. For example, the electronic device 1000 may be implemented as a cellular phone, a video phone, a smart pad, a smart watch, a tablet PC, a car navigation system, a smart phone, a laptop, a head mounted display HMD device, and the like.

The processor 1010 may perform various computing functions. The processor 1010 may be a micro processor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and characteristics of embodiments according to the present disclosure. Accordingly, all such modifications are intended to be included within the scope of embodiments according to the present disclosure as defined in the claims, and their equivalents. In the claims, means-plus-function clauses are intended to cover the structures described herein as performing the recited function and not only structural equivalents but also equivalent structures. Therefore, it is to be understood that the foregoing is illustrative of aspects of embodiments according to the present disclosure and is not to be construed as limited to the specific embodiments disclosed, and that modifications to the disclosed embodiments, as well as other embodiments, are intended to be included within the scope of the appended claims. Embodiments according to the present disclosure are defined by the following claims, with equivalents of the claims to be included therein.

What is claimed is:

1. A display device, comprising:

a display panel including compensation blocks;

a driving controller configured to perform a luminance compensation on the compensation blocks to generate a data signal based on input image data; and a data driver configured to generate a data voltage based on the data signal and to provide the data voltage to the display panel, wherein the driving controller is configured to select a size and a position of the compensation blocks based on a selection curvature to perform the luminance compensation on the compensation blocks, wherein the driving controller is configured to calculate a target angle based on the selection curvature, wherein the compensation blocks include first compensation blocks having a first size and second compensation blocks having a second size different from the first size, and wherein the driving controller is configured to calculate a size and a position of the first compensation blocks and the second compensation blocks based on the target angle.

2. The display device of claim 1, wherein the selection curvature is variable according to a user setting through a user interface.

3. The display device of claim 2, wherein, as a distance from a center line increases, a perceived luminance of a test image displayed on the user interface decreases.

4. The display device of claim 3, wherein a luminance compensation value of the test image is different according to the selection curvature.

5. The display device of claim 4, wherein the luminance compensation value of the test image increases based on the selection curvature increasing.

6. The display device of claim 1, wherein the second size is greater than the first size.

7. The display device of claim 6, wherein the second size increases based on the target angle increasing.

8. The display device of claim 1, wherein a position of the first compensation blocks are closer to a center line than a position of the second compensation blocks.

9. The display device of claim 8, wherein a ratio of the second compensation blocks to an entire display area of the display panel increases based on the target angle increasing.

10. The display device of claim 1, wherein the compensation blocks include third compensation blocks having a third size different from the first size and the second size, and wherein the driving controller is configured to calculate a size and a position of the first compensation blocks, the second compensation blocks, and the third compensation blocks based on the target angle.

11. The display device of claim 10, wherein the third size is greater than the first size and the second size, and the second size is greater than the first size.

12. The display device of claim 11, wherein a distance from a center line increases in an order of the first compensation blocks, the second compensation blocks, and the third compensation blocks.

13. The display device of claim 1, wherein the display device further comprises a user gaze tracker configured to track a gaze of the user, and wherein the driving controller is configured to select the size and the position of the compensation blocks based on the gaze of the user and the selection curvature, and to perform the luminance compensation on the compensation blocks.

14. An electronic device, comprising:

a display panel including compensation blocks;

a driving controller configured to perform a luminance compensation on the compensation blocks to generate a data signal based on input image data;

a data driver configured to generate a data voltage based on the data signal and to provide the data voltage to the display panel; and a processor configured to control the driving controller, wherein the driving controller is configured to select a size and a position of the compensation blocks based on a selection curvature to perform the luminance compensation on the compensation blocks, wherein the driving controller is configured to calculate a target angle based on the selection curvature, wherein the compensation blocks include first compensation blocks having a first size and second compensation blocks having a second size different from the first size, and wherein the driving controller is configured to calculate a size and a position of the first compensation blocks and the second compensation blocks based on the target angle.

15. A method of compensating a luminance of a display panel, the method comprising:

selecting a selection curvature;

selecting a size and a position of compensation blocks based on the selection curvature; and performing a luminance compensation on the compensation blocks, wherein a target angle is calculated based on the selection curvature, wherein the compensation blocks include first compensation blocks having a first size and second compensation blocks having a second size different from the first size, and wherein a size and a position of the first compensation blocks and the second compensation blocks are calculated based on the target angle.

16. The method of claim 15, wherein the selection curvature is variable according to a user setting through a user interface.

17. The method of claim 16, wherein, as a distance from a center line increases, a perceived luminance of a test image displayed on the user interface decreases.

18. The method of claim 17, wherein a luminance compensation value of the test image is different according to the selection curvature.

* * * * *